United States Patent [19]

Kohn

[11] 4,122,878
[45] Oct. 31, 1978

[54] TECHNIQUE FOR CONVERTING BALSA LOGS INTO PANELS

[75] Inventor: Jean Kohn, New York, N.Y.

[73] Assignee: Baltek Corporation, Northvale, N.J.

[21] Appl. No.: 860,617

[22] Filed: Dec. 14, 1977

[51] Int. Cl.² .................... B27D 1/00; B27F 7/00; B32B 31/00
[52] U.S. Cl. .................... 144/316; 144/314 R; 156/264
[58] Field of Search .................... 156/264; 428/44, 48; 144/316, 309 L, 314 R, 314 BA, 315 R

[56] References Cited

U.S. PATENT DOCUMENTS

| 301,068 | 6/1884 | Parmelee | 144/316 |
| 781,376 | 1/1905 | Sorensen | 144/316 |
| 2,062,590 | 12/1936 | Lundquist | 156/264 |
| 3,961,654 | 6/1976 | Hasenwinkle | 156/264 |
| 3,989,078 | 12/1976 | Hasenwinkle | 156/264 |

*Primary Examiner*—Douglas J. Drummond
*Attorney, Agent, or Firm*—Michael Ebert

[57] ABSTRACT

A high yield technique for converting round logs of balsa or other species of wood of relatively small diameter into large rectangular panels, the percentage of log volume that is converted being substantially greater than with prior techniques. The logs are radially sectioned into sectors having the same apex angle. Each sector is then longitudinally cut at its apex and arc to define a truncated feedstock piece whose cross-section is that of an isosceles trapezoid, the feedstock pieces being of variable width depending on the diameters of the logs from which they are derived. The pieces are fitted together in a complementary manner to create uniform layers which are superposed to form a stack defining a dry block assembly. The end pieces in each layer are constituted by feedstock piece halves to present a vertical block edge. All feedstock pieces in the dry block assembly are then wet-coated with a curable adhesive. The wet assembly is placed in a press and subjected to compression in orthogonal directions until the adhesive is cured and the pieces interlaminated to provide an integrated stock block. The stock block is then removed from the press and divided into panels of the desired thickness and grain direction.

14 Claims, 12 Drawing Figures

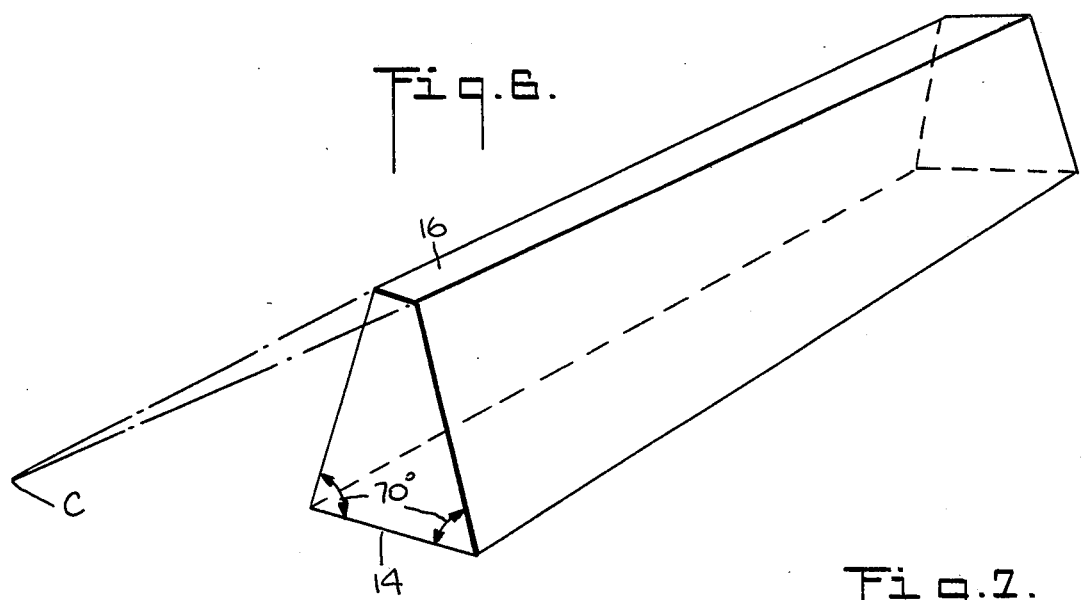
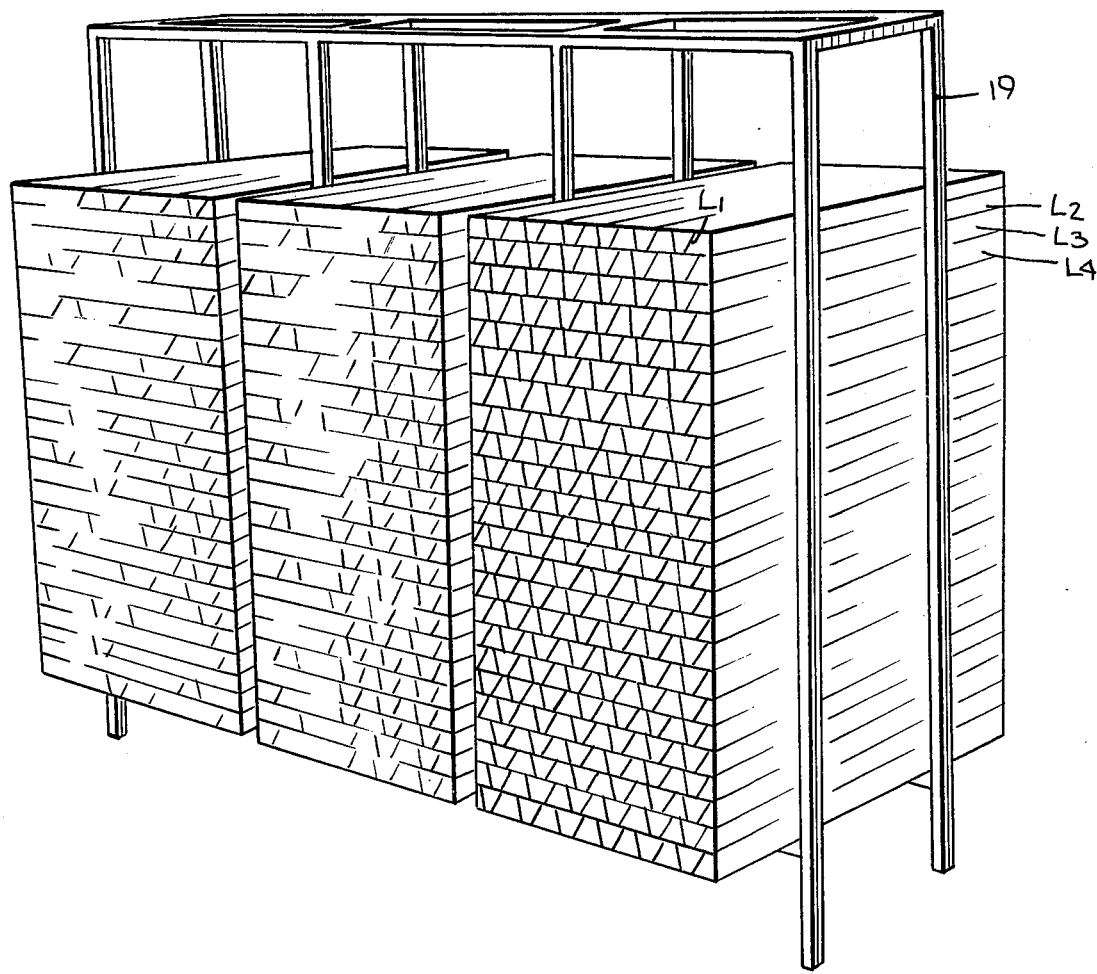

TECHNIQUE FOR CONVERTING BALSA LOGS INTO PANELS

BACKGROUND OF INVENTION

This invention relates generally to a technique for converting round logs into lumber products by cutting the logs into pieces which are then joined together, and more particularly to a technique in which the logs are cut into feedstock pieces having an isosceles trapezoidal cross-section, the pieces being fitted together in a complementary manner to create uniform layers which are superposed to form a stack defining a block assembly, the pieces in the block assembly being interlaminated to form an integrated stock block that is dividable into usable panels.

A technique in accordance with the invention, though applicable to various species of wood, is of particular value in connection with balsa wood derived from a tropical American tree (Ochroma pyramidale). Balsa wood has outstanding properties unique in the lumber field; for on the average, it weighs less than 9 pounds per cubic foot, this being 40% less than the lightest North American species. Its cell structure affords a combination of high rigidity and compressive and tensile strength superior to any composite or synthetic material of equal or higher density. While a technique in accordance with the invention will be described herein only in regard to balsa wood, it is to be understood that it is also applicable to many other wood species.

The market potential for balsa wood board is considerable; for structural sandwich laminates can be created by bonding thin facings or skins to balsa wood panels which function as a core. Thus the Kohn et al. U.S. Pat. No. 3,325,037 and the Lippay U.S. Pat. No. 3,298,892 disclose structural sandwich laminates whose core is formed of end grain balsa wood, the laminates having an exceptionally high strength-to-weight ratio as well as excellent thermal insulation properties.

End-grain balsa-cored sandwich laminates are widely used in transportation and handling equipment, such as for floors of railroad cars, shipping containers, cargo pallets, bulkheads, doors, reefer bodies, as well as in a wide variety of other applications. These laminates are also employed for structural insulation in aircraft applications, housing and in boating.

Where the structure to be reinforced is constituted by planar surfaces, the balsa core may simply be a solid board or panel laminated to the facings. But in the case of hulls and other structures having single or double curvatures, or other complex contours, it is ordinarily not possible to conform solid balsa to the contoured surface without bending the balsa panel, and this involves difficult, time-consuming and expensive procedures.

As noted in the Shook U.S. Pat. No. 3,540,967, contourable balsa blankets have been developed that are composed of small individual balsa blocks cut from a board. The blocks are attached to a common carrier, such as a fabric scrim, whereby the blanket may readily be conformed to a curved surface for lamination thereto.

Such blankets, which are commercially available under the trademark "Contourkore," are useful in the construction of reinforced plastic boats and larger vessels, for they lend themselves to lamination between layers of reinforced fiberglass or other plastic material, thereby bringing about a distribution of weight favorable to high stability and buoyancy, as well as imparting stiffness to the structure. While the technique in accordance with the invention produces balsa panels, it is to be understood that these panels may be cut into small blocks or tiles to produce contourable balsa blankets.

As pointed out in the above-identified Kohn et al. and Lippay patents, quite apart from the structural merits of balsa, this wood is of particular value in cryogenic applications, for it has a low coefficient of expansion and hence deforms only slightly under severe temperature changes. Moreover, the k-factor of balsa wood is such as to render this material highly suitable as thermal insulation. The symbol for thermal conductivity is the k-factor, this being the amount of heat expressed in BTU's transmitted in 1 hour through 1 square foot of homogeneous material, 1 inch thick, for each degree of Fahrenheit of temperature difference between opposed surfaces of the material.

If, however, as indicated in the Roberts et al. U.S. Pat. No. 3,894,372, one constructs a system of thermal insulating laminates using a core entirely of balsa board, the cost thereof is quite high. On the other hand, should one make this system with a core of foam plastic thermal insulating material, the cost would then be much lower. But the structural characteristics of the system would be distinctly inferior to balsa; for while foam plastics have acceptable thermal insulating qualities in the cryogenic range, they have poor structural properties.

A factor which the above-identified Roberts et al. patent does not take into account but which, in an era of rising energy costs, now plays a major role in weighing the relative merits of foam plastic material and balsa wood for thermal insulation, is the TOE factor; i.e., "Tons Oil Equivalent."

Foam plastic materials such as polyurethane and polyvinyl chloride (PVC) are petroleum derivatives, and in determining the TOE factor, one must consider the amount of petroleum needed as feedstock for the plastic as well as the amount of petroleum entailed in supplying energy in the form of fuel, electricity or steam to process the plastic material. In the case of balsa, which is a renewable natural product, the TOE is determined mainly by the energy requirements to convert logs into usable board.

Tests indicate that the production of balsa board requires only about 0.150 TOE per 1000 board feet (a board foot is a unit of quantity for lumber equal to the volume of a board $12 \times 12 \times 1$ inches). However, in the case of rigid polyurethane foam of 5 lbs. per cubic foot density, the TOE factor is about 0.565 per 1000 board feet, while in the case of rigid PVC foam of 4.65 lbs. per cubic foot density, the TOE factor is about 0.275 per 1000 board feet.

Hence the TOE factor for balsa production is much lower than for the most widely used synthetic foam plastic materials suitable for thermal insulation. In an era when the conservation of diminishing and non-replaceable petroleum resources is of growing urgency, this distinction is of crucial economic importance.

The reason why foam plastic material is often used in preference to balsa panels as a core material, despite the fact that foam plastic has a much higher TOE factor and is structurally inferior to balsa wood, is that the cost of balsa wood, which is somewhat higher than many foam plastic materials, has heretofore discouraged its use in many industrial and marine applications. One must bear in mind that the cost of a balsa wood product is keyed to the low yield obtainable when employing conventional techniques to convert balsa logs into a usable product.

The traditional conversion technique results in a low yield in that the amount of balsa convertible into usable lumber is usually less than half the total volume of wood in the log. This is primarily due to the constraint that only rectangular or square pieces can be cut from a cylindrical log to produce a final lumber product that has a rectangular form.

In the traditional process, a series of longitudinal cuts are made through the log to produce so-called "flat sawn" pieces whose broad faces lie in a plane parallel to a tangent to the curvature of the cylindrical log. Flat sawn pieces not only give rise to a substantial amount of wood waste, but such pieces tend to warp during the kiln drying process. And even when adequately dried, flat sawn pieces undergo dimensional changes as a result of variations in air moisture or relative humidity, this resulting in deformation of the final product.

As noted in the "Wood Handbook" (Agriculture Handbook No. 72), published by Forest Products Laboratory of the U.S. Dept. of Agriculture (Aug. 1974), the characteristic shrinkage and distortion of flats and squares cut from a log is affected by the direction of the annular rings, tangential shrinkage being about twice as great as radial.

In order to improve the yield obtained from cylindrical logs, it is known to cut logs into interfitting sectors and to join these sectors together to form lumber products. Among U.S. patents which disclose a process for making lumber products in this manner are the Sorensen U.S. Pat. No. 781,376, the Anderson U.S. Pat. No. 2,878,844 and the patents to Hasenwinkle, U.S. Pat. Nos. 3,903,943; 3,961,644 and 3,989,078.

However, none of these prior patents discloses a high yield technique which, when applied to balsa wood, results in balsa wood panels that can be either of the end grain or flat grain type, and which makes it possible to exploit balsa logs in a broad range of diameters running between very young trees having a four-inch diameter and fully mature trees of twenty-inch diameter or greater.

The present invention takes advantage of the fact that balsa trees are fast growing and reach cutting maturity within six to eight years, at which time the diameter at breast high (DBH) can be 10 to 12 inches. Since the invention makes it possible to also exploit young balsa trees of small diameter that are lighter and more readily available than older and larger trees, the invention lends itself to large scale balsa production on ordinary plantations with a very rapid turnover of trees in the order of 4 to 6 years.

SUMMARY OF INVENTION

In view of the foregoing, the main object of this invention is to provide a high yield technique for converting generally cylindrical wood logs in a broad range of diameters into large rectangular panels, whereby the percentage of log volume converted into panels is substantially increased.

Another object of this invention is to provide a technique of the above-type in which balsa logs are cut into sectors whose faces are parallel to the radii of the cylindrical log, such radially cut balsa sectors not being subject to significant warpage in the course of subsequent kiln drying.

Yet another object of this invention is to provide a technique in which the log is radially sectioned into sectors which are then worked into feedstock pieces having an isosceles trapezoidal cross-section, the feedstock pieces being assembled into a multilayer block assembly having vertical sides.

Also an object of the invention is to provide a technique in which the feedstock pieces in the multilayer block assembly are laminated together to form an integrated block that may be divided in the X or Y direction into large panels which are of the end grain or flat grain type.

Among the significant advantages of a technique in accordance with the invention are the following:

1. Because this technique makes it possible to commercially exploit young balsa trees of small diameter as well as more mature trees of larger diameter, better forest management is facilitated thereby.

2. Because this technique affords an exceptionally high yield, one can, assuming balsa logs which are 16 feet long and of 12-inch diameter, derive 1000 board feet of balsa product from only 20 logs, as compared to the 60 logs of the same dimensions that are required when using conventional sawing techniques.

3. Because the yield obtained by this technique is so much greater than with conventional sawing techniques, this results in a sharp drop in the cost of producing balsa boards and makes it possible to reduce balsa prices to a level competitive with foam plastic suitable for thermal insulation.

4. Because it becomes economically feasible to substitute balsa boards for foam plastic thermal insulation, one can take advantage of the superior structural properties of balsa and also gain significant TOE factor benefits, with a marked reduction in the consumption of petroleum.

5. Because the block assembly is composed of a stack of superposed layers, one may interleave therewith sheets of material impervious to a cryogenic liquid, whereby these sheets are incorporated in the integrated block and become a part of the panels divided therefrom to provide balsa panels having secondary barriers which resist leakage of cryogenic liquids.

6. Because the log is preferably cut radially into eight sectors, the resultant area of the exposed surfaces is far greater than that obtained when a log is cut into pieces having a square or rectangular cross-section. As a consequence, the drying time of the sectors when placed in a standard kiln is much shorter than for the same volume of square or rectangular pieces. This reduction in drying time is reflected in significant economies in the fuel required to generate the necessary heat.

Briefly stated, these objects are attained in a high-yield conversion technique for balsa logs in a range of diameters from about four to twenty inches, which technique involves the following steps:

A. The logs, regardless of their diameter, are radially sectioned into sectors all having the same apex angle.

B. The sectors are then kiln-dried in standard lumber drying kilns to a moisture content of about 12 percent or less.

C. Each kiln-dried sector is then longitudinally cut at its apex and its arc to define a feedstock piece whose cross-section is that of an isosceles trapezoid. All pieces derived from a log of given diameter are cut to the same height and with the same base angles, the pieces having a variable width depending on the diameter of the logs from which they are derived.

D. The pieces are then fitted together in a complementary manner within a frame to form a stack of superposed layers defining a dry block assembly; the end pieces on each layer being constituted by right angle feedstock halves to present a vertical block edge.

E. All pieces in the dry block assembly are then wet-coated with a curable adhesive and transferred to a press where the assembly is subjected to compression in orthogonal directions. Pressure is maintained until the adhesive is cured and the pieces interlaminated to provide an integrated stock block.

F. The integrated block is then removed from the press, and the block is divided in the X or Y direction into balsa wood panels having the desired grain orientation.

OUTLINE OF DRAWINGS

For a better understanding of the invention as well as other objects and further features thereof, reference is made to the following detailed description to be read in conjunction with the accompanying drawings, wherein:

FIG. 6 is a geometric representation of the feedstock piece;

FIG. 7 illustrates schematically the frame in which feedstock pieces are assembled to produce a dry block assembly;

DESCRIPTION OF INVENTION

Figure 1:
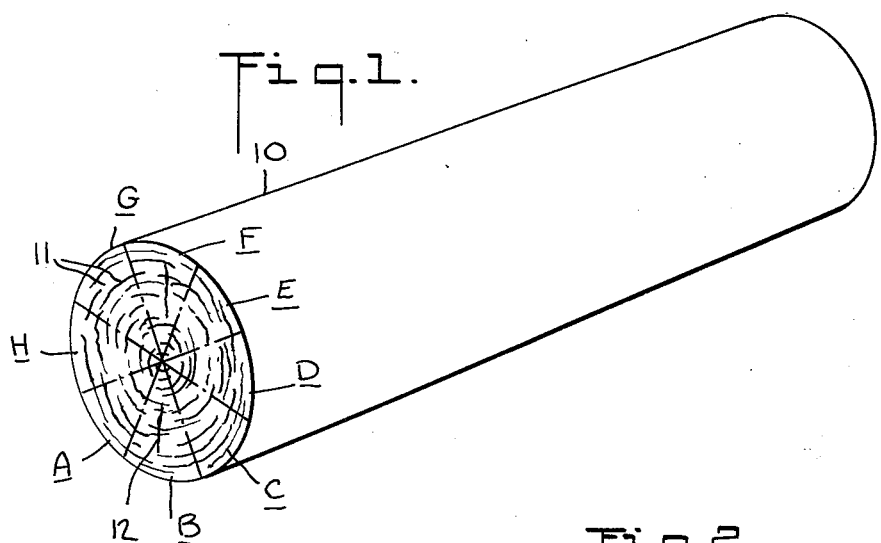
FIG. 1 is a perspective view of a typical balsa log to be converted into a panel by a technique in accordance with the invention.

Referring now to FIG. 1, there is shown a round log 10 of balsa wood, the log having a diameter of 4 to 20 inches depending on the age of the tree from which the log is cut. Log 10, which is formed with concentric annular rings 11 and rays 12, is radially sectioned into eight like sectors A, B, C, D, E, F, G, and H.

Figure 2:
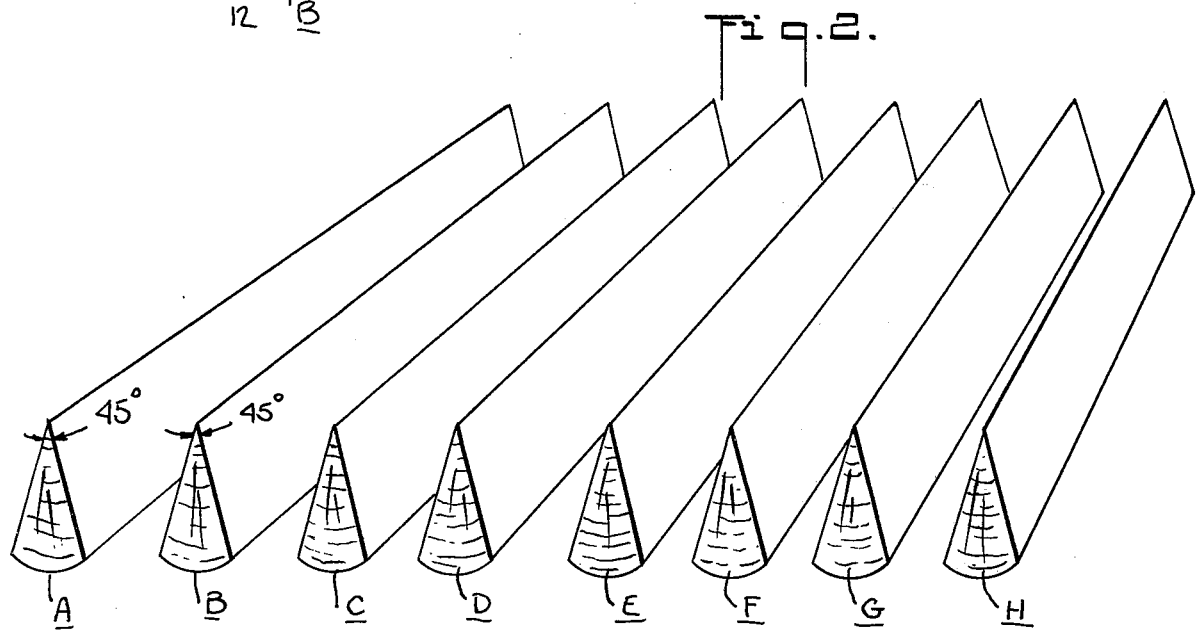
FIG. 2 shows the eight sectors obtained by radially sectioning the log.

In practice, such radial sectioning is typically effected by first cutting the log in a diametrical plane with a circular or band saw into two equal halves. Then each log half is sawed into two equal parts, producing four quarters. Finally, the quarters are bisected to produce eight like sectors. Thus, as shown in FIG. 2, from each log is derived eight sectors A to H, the apex of each sector having a 45° angle.

While it is possible to radially section the log into sectors having apex angles other than 45°, the advantage of dividing the log radially into eight sectors is that one may employ simple and easily-handled sawing equipment for this purpose, this being desirable in remote areas of a balsa wood forest. Also, with eight sectors one obtains a good yield from small diameter logs and it becomes relatively easy, after the sectors are kiln-dried, to mill the sectors to size with ordinary woodworking equipment.

Sectors A to H, which are all of the same length, are then kiln-dried in a conventional oven of the type used for lumber drying. This procedure acts to reduce the moisture content of the sectors to 12 percent or less, this being standard practice in the lumber industry. The moisture content of a piece of wood is determined by the following equation:

$$\frac{\text{Wet Weight} - \text{Oven Dry Weight}}{\text{Oven Dry Weight}} \times 100 = \% \text{ moisture content}$$

The steps necessary to kiln-dry wood and recommended practices therefor are set forth in publication #188 of the U.S. Dept. of Agriculture, Forest Service, Forest Products Laboratory.

While a 12% or less moisture content for the sectors is preferred, a higher percentage can be tolerated if the water-resistant adhesive thereafter used to laminate the pieces is effective at these higher percentages. However, a higher moisture content might cause excessive shrinkage at a later stage, which is undesirable.

Figure 3:
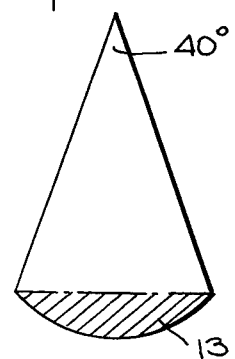
FIG. 3 is an end view of one of the sectors showing the arc area that is cut therefrom.
Figure 4:
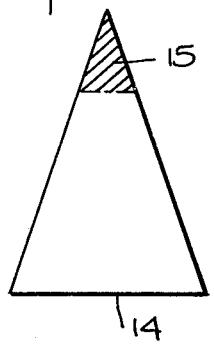
FIG. 4 is an end view of the same sector showing the apex area that is cut therefrom to impart an isosceles trapezoid cross-sectional form thereto.

The kiln-dried sectors are then milled to produce feedstock pieces whose cross-sectional area is that of an isosceles trapezoid. This is accomplished in a series of three steps. First, as shown in FIG. 3, the sector is cut longitudinally to excise the arcuate region 13 between the arc and the cord, thereby establishing a flat base 14, as shown in FIG. 4. It is to be noted that while the sectors before being kiln-dried had an apex angle of 45° as a result of shrinkage, the kiln-dried sector now has an apex angle of 40°.

Figure 5:
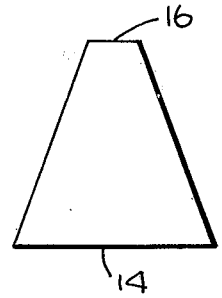
FIG. 5 is an end view of the same sector indicating the sides which are milled to form a feedstock piece.

The next step is to truncate the small apex region 15 shown in FIG. 4 to produce a flat top 16. As shown in FIG. 5, flat top 16 is parallel to base 14, this second step resulting in the isosceles trapezoidal cross-section. Then the two inclined sides 17 and 18 are planed to a smooth finish to complete the feedstock piece.

It will be appreciated that no more of each sector is excised than is necessary to remove the arcuate region 13 which represents a small volume of wood and to truncate the apex region 15, this representing an even smaller volume of wood. Hence by radially cutting the log into triangular sectors and then milling the sectors to flatten out the arcs and peaks, the loss in wood volume as a result of these operations is minimal and far less than that experienced with conventional log conversion procedures, thereby enhancing the yield.

Geometrically, each piece, which now serves as a feedstock piece for producing a stock block from which the panels are derived, has the formation shown in FIG. 6. It will be seen in the example illustrated that the base angles of the feedstock piece are both 70°, for the apex angle after shrinkage is 40°. It is also to be noted that the piece has a wedge-like formation, in that the log from which it is taken has the shape of a truncated cone; for the trunk of a tree has a natural, gradual taper. Thus in geometric terms, imaginary lines projected from the longitudinal edges of the piece converge toward a common center C. By juxtaposing such pieces in reverse relation, the taper is effectively cancelled out.

The next step is to set up feedstock pieces of the same height in side-by-side and reversely-oriented relation with their angled sides complementing each other to form an even layer which, for example, may be 24 inches wide. The height of the pieces depends, of course, on the diameter of the log from which the pieces are derived. Thus if the logs being processed are graded into three classes—i.e., small, medium and large diameter—the feedstock pieces will then have heights falling into corresponding classes. The layers $L_1$, $L_2$, $L_3$, $L_4$ etc. thus formed are superposed to form a stack, as shown in FIG. 7. These superposed layers are temporarily held in place in a simple frame 19 to prevent the small pieces from falling out. The stack of superposed layers constitute a dry block assembly which, in practice, may be 2 feet wide and 4 feet tall, or whatever other practical dimensions are dictated by the available equipment.

While the three steps for converting a log into feedstock pieces has been described as taking place sequentially, it is to be understood that in practice a cutting machine may be provided to carry out these steps concurrently.

Figure 8:
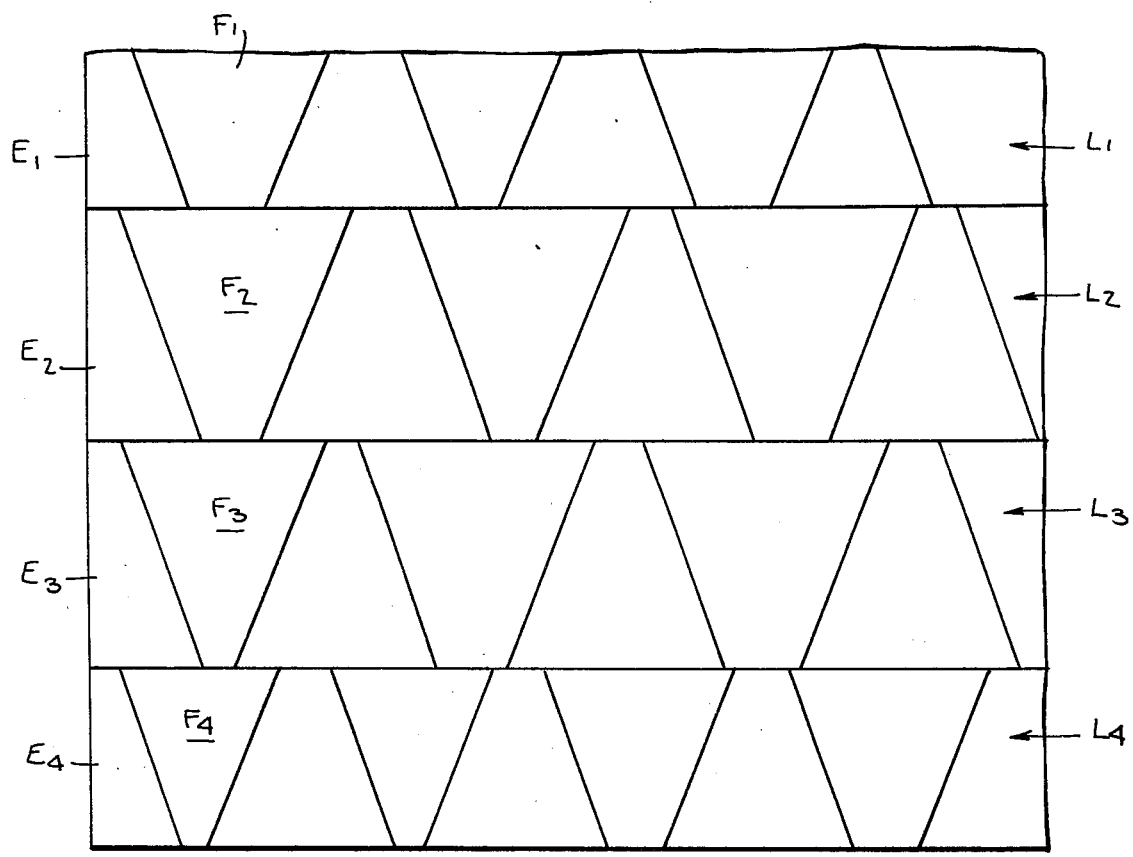
FIG. 8 is an enlarged end view of three layers of the block to show the end pieces on the layers.

In order to provide lateral faces or block edges which are vertical, the ends of each layer ($L_1$, $L_2$, $L_3$ etc.) are terminated by feedstock piece halves, such as end pieces $E_1$, $E_2$ and $E_3$ shown in FIG. 8. It will be evident that when a feedstock piece having an isosceles trapezoidal cross-section is cut in half to produce two end pieces, each end piece has a slanted side and a vertical side. The slanted side of an end piece complements the slanted side of the adjacent feedstock piece ($F_1$, $F_2$, $F_3$) in the layer, the vertical side forming the edge of the block assembly.

It will also be seen that the several pieces which form layer $L_1$ have somewhat different widths, but they all have exactly the same height, this being true also of layers $L_2$ and $L_3$. However, while the layers are all uniform in length and width, they differ in height; for in extracting pieces from logs of large diameter to obtain the maximum yield therefrom, the resultant pieces are necessarily higher than those extracted from logs of smaller diameters, consequently, the overall pattern of pieces in the blocks is more or less random so that when the pieces are glued together, the glue lines of the various pieces are not in registration with each other, and the resultant reticulated formation of glue lines in combination with blocks of random widths acts to strengthen the block structure.

In prior sector cutting techniques to improve yield, such as those disclosed in the above-identified Hasenwinkle patents, the angle of cutting is dictated by the diameter of the log being cut, a different angle being required for a different log diameter. In contradistinction, with the present technique, the radial cutting angle, whether 45° or whatever other angle is selected, is the same regardless of the diameter of the log. This is an important practical advantage of the invention.

Figure 9:
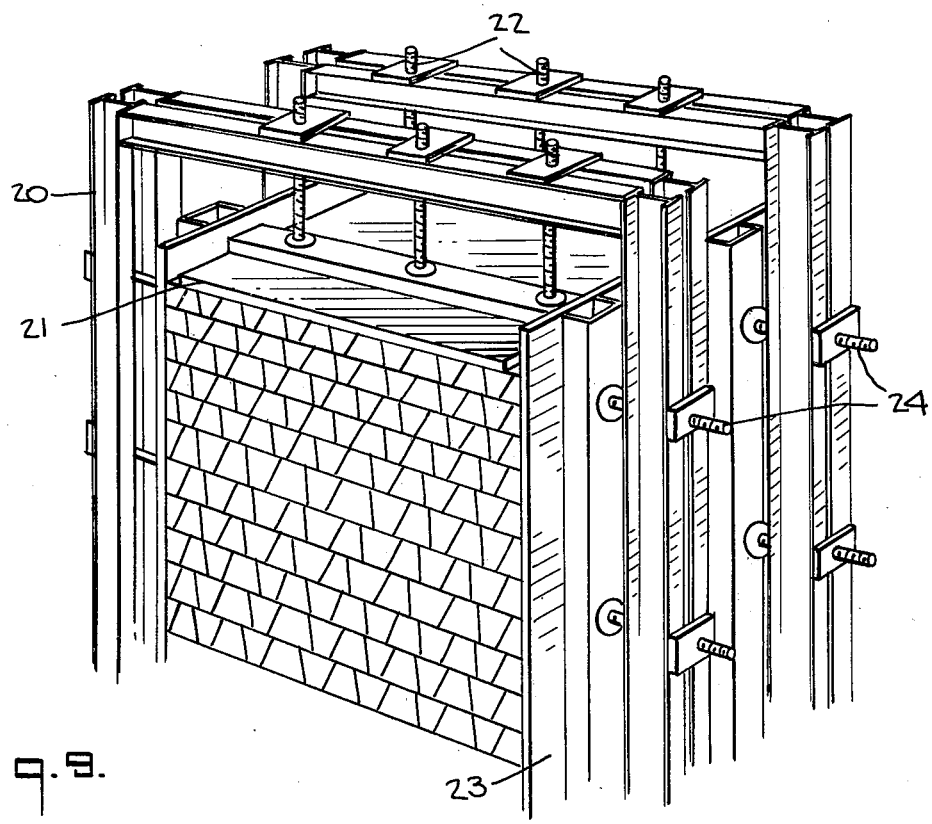
FIG. 9 shows the press for interlaminating the pieces in the dry block assembly to produce an integrated block.

To form an integrated block, the pieces of the dry block assembly are taken from frame 19 and wet-coated with a suitable water-resistant adhesive resin such as urea formaldehyde or phenol resorcinol formaldehyde, the wet pieces being reassembled in a cold setting press, as shown in FIG. 9. This press is provided with an I-beam frame 20 which is large enough to accommodate the block assembly, an adjustable horizontal pressure plate 21 operated by vertical screws 22 and an adjustable vertical pressure plate 23 operated by horizontal screws 24, pressure plate 21 being movable toward or away from the top surface of the block assembly and pressure plate 23 being movable toward or away one side surface of the block assembly. The bottom surface of the block assembly rests on a base plate in the press and the other side surfaces of the block assembly abuts a fixed side plate.

By turning in the vertical and horizontal screws to press the pressure plates against the wet block assembly, the assembly in the press is subjected to compression in orthogonal directions. This condition is maintained until such time as the adhesive is fully cured and the pieces laminated together to form an integrated stock block SB.

Figure 10:
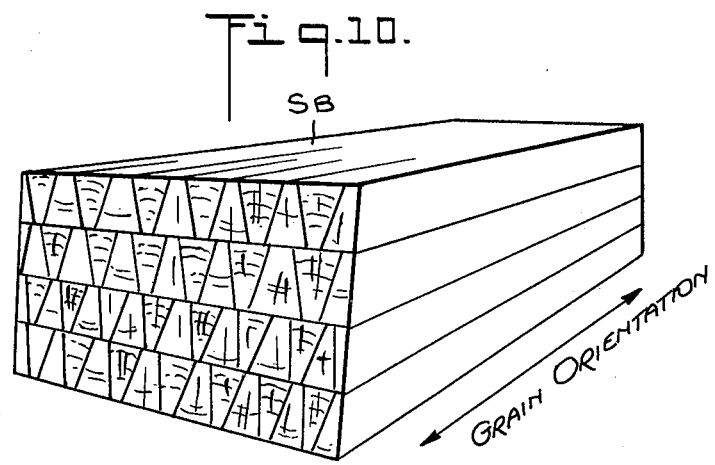
FIG. 10 shows the integrated block removed from the press.
Figure 11:
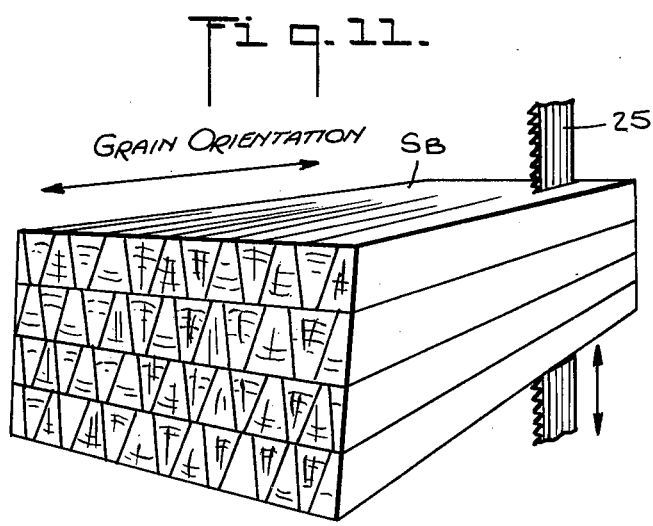
FIG. 11 illustrates the manner in which the integrated block is divided to provide flat grain balsa panels.

The integrated stock block SB, as shown in FIG. 10, is then removed from the press. The grain direction of the stock block extends longitudinally, for all pieces thereof have the same orientation. This stock block can now be divided to provide either flat grain or end grain balsa panels of the desired thickness. A flat grain panel is one in which the balsa fibers run parallel to the faces of the panel. To produce flat grain panels, the stock block SB, as shown in FIG. 11, is sliced into panels by a wide band saw 25 operating in the longitudinal direction of the block.

Figure 12:
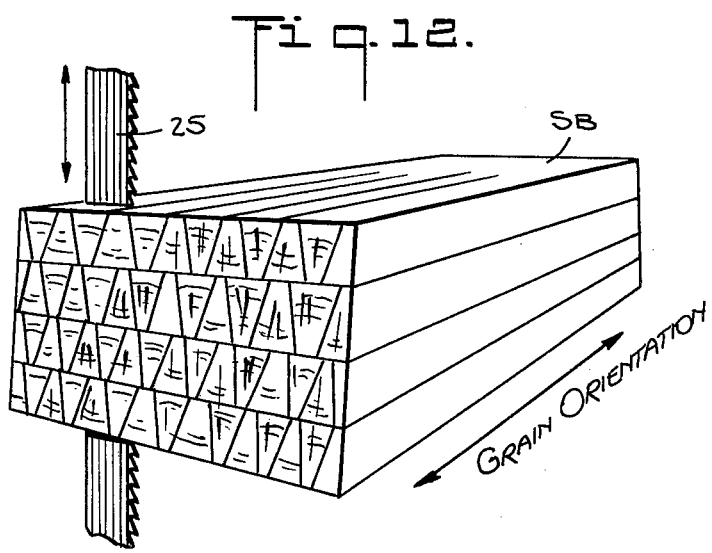
FIG. 12 illustrates the manner in which the integrated block is divided to produce end grain balsa panels.

An end grain panel is one in which the balsa fibers are perpendicular to the faces. The same stock block SB may be divided to provide end grain panels. In this instance, as shown in FIG. 12, saw 25 is operated in the transverse direction of the block.

The end grain or flat grain panels thus produced are then planed or sanded, as the case may be, to obtain either a better finish or a more precise thickness. Flat grain panels can be sanded or planed, whereas end grain panels can only be sanded. The panels are then trimmed to the width and length specified by the ultimate user.

Apart from the previously-mentioned advantages that are gained when radially-sectioning a log and producing trapezoidal pieces therefrom as contrasted to flat-sawing a log into pieces having square or rectangular cross-section, it is to be noted that when the pieces of trapezoidal cross-section are reversely-oriented and assembled in a complementary manner into layers which are stacked to form a block, the trapezoidal geometry of these pieces produces a more effective intermesh than square pieces. Furthermore, the interfacial areas between trapezoidal pieces for a given block volume are much greater than with square pieces, thereby affording enlarged glueing surfaces and superior interlamination of the pieces.

Panels derived in accordance with the invention from trapezoidal feedstock pieces are of better quality than those made from square feedstock pieces. Indeed, a comparative examination of panels made from trapezoidal pieces almost invariably show the panels to be planar and free of warpage, whereas panels fabricated from square pieces are often more or less deformed.

While in a radial-cutting technique in accordance with the invention, the apex of each sector is discarded—and this constitutes waste, since the apex is derived from the pith or central zone of the log, this zone represents only a slight fraction of the total volume of the log, and the waste is therefore minimal. Moreover, the pith of a balsa log forms the least desirable portion thereof in terms of lumber quality.

The fact that the pith or central zone of a balsa log represents but a small percentage of its total volume will now be demonstrated. An analysis of typical log volume indicates that when one divides a log of 13-inch diameter into annular zones of 1 inch width concentrically surrounding an innermost pith zone of 2-inch diameter, the volume of this pith zone constitutes a mere 0.57% of the total volume as compared to the outermost zone which constitutes about 15% of the total volume. Hence the loss suffered by discarding the pith zone is inconsequential.

The balsa panels, as explained previously, may be converted into contourable blankets, such as those disclosed in the Shook U.S. Pat. Nos. 3,376,185 and 3,309,342. Or the balsa panels may be used in cryogenic applications, as in the Kohn U.S. Pat. No. 3,325,037 and the Roberts U.S. Pat. No. 3,894,372, where laminates which employ the panels as core material afford thermal insulation and structural support for a tank containing a cryogenic liquid, such as liquefied natural gas. In cryogenic applications, the balsa panels may be arranged to form multi-ply and cross-ply structures.

In the storage and transportation of cryogenic liquid in tanks surrounded by thermal insulation, the problem of safety is of the utmost importance. Thus if the insulation stands between the tank and the metal hull of a vessel to transport the liquid, should the tank be faulty and the cryogenic liquid seep through the insulation and reach the hull, the extreme low temperature of the liquid can produce a thermal shock that may fracture the hull.

As a safety measure, one may, in accordance with the invention, embed a secondary barrier into the panels, the secondary barrier being impervious to cryogenic liquid. (The tank containing the liquid is regarded as being the primary barrier). To this end, sheets of sugar maple, Japanese birch veneer or sythetic plastic film may be interleaved with the layers $L_1$, $L_2$ etc. of the dry block assembly and glued to the layers when forming the integrated stock block. Then when the integrated block is divided, these secondary barrier sheets are incorporated in the panels. Thus instead of having only one secondary safety barrier at the facing of the thermal insulation as in conventional cryogenic arrangements, a large number of intermediate secondary safety barriers can be incorporated into cryogenic insulation panels to render the final assembly safer.

Large size panels can be assembled from smaller size panels by the use of finger joints or other known expedients. Larger than normal size panels are often required in making cryogenic insulation panels; for a typical specification for this purpose is a panel measuring seven by ten feet. It is not practical to produce integrated blocks in this large size.

While there has been shown and described a preferred embodiment of a technique for converting balsa logs into panels in accordance with the invention, it will be appreciated that many changes and modifications may be made therein without, however, departing from the essential spirit thereof. Thus instead of using screws to force the pressure plates against the block in the press, this action may be carried out by hydraulic or pneumatic means.

I claim:
1. A high yield technique for converting logs of different diameter into large rectangular panels, said technique comprising the steps of:
   A. radially cutting each log into a plurality of sectors having the same apex angle;
   B. longitudinally cutting each sector both at its apex and at its arc to form a truncated feedstock piece whose cross-sectional geometry is that of an isosceles trapezoid, all feedstock pieces having the same base angles and a variable width depending on the diameter of the logs from which they are derived;
   C. fitting together pieces in a complementary manner to create layers thereof which are superposed in a stack to define a dry block assembly;
   D. wet-coating the feedstock pieces in the dry block assembly with a curable adhesive to form a wet block assembly;
   E. subjecting the wet block assembly to compression in orthogonal directions for a period sufficient to cure the adhesive and to interlaminate the feedstock pieces to produce an integrated stock block; and
   F. dividing the block into panels.

2. A technique as set forth in claim 1, wherein said layers are provided with end pieces constituted by feedstock piece halves to present vertical edges.

3. A technique as set forth in claim 1, wherein the pieces are derived from tapered logs and therefore have a wedge-like formation, the complementary pieces forming each layer being reversely oriented to effectively cancel out said taper.

4. A technique as set forth in claim 1, wherein said logs are of balsa wood.

5. A technique as set forth in claim 4, wherein said sectors are kiln-dried before being cut into feedstock pieces.

6. A technique as set forth in claim 5, wherein said sectors are dried to a moisture content of about 12 percent.

7. A technique as set forth in claim 1, wherein said log is cut into eight sectors, each sector having an apex angle of 45°.

8. A technique as set forth in claim 1, wherein said curable adhesive is a water-resistant synthetic adhesive.

9. A technique as set forth in claim 8, wherein said adhesive is urea formaldehyde.

10. A technique as set forth in claim 8, wherein said adhesive is phenol resorcinol formaldehyde.

11. A technique as set forth in claim 4, wherein said block is divided in a direction producing end grain balsa panels.

12. A technique as set forth in claim 4, wherein said block is divided in a direction producing flat grain balsa panels.

13. A technique as set forth in claim 4, wherein said layers are interlaced with sheets which are impervious to cryogenic liquid.

14. A technique as set forth in claim 13, wherein said sheets are formed of Japanese birch veneer.

* * * * *